United States Patent [19]

Rios

[11] 4,401,339

[45] Aug. 30, 1983

[54] AIR DEFLECTOR FOR VEHICLES

[76] Inventor: Roberto Rios, 533 E. 182nd St., Carson, Calif. 90746

[21] Appl. No.: 216,375

[22] Filed: Dec. 15, 1980

[51] Int. Cl.³ .............................................. B62D 35/00
[52] U.S. Cl. .................... 296/1 S; 293/118
[58] Field of Search ................. 296/1 S, 91; 293/118; 105/2 R, 2 B; 180/903

[56] References Cited

U.S. PATENT DOCUMENTS

| 3,977,716 | 8/1976 | Whited | 296/1 S |
| 4,119,339 | 10/1978 | Heimburger | 296/1 S |
| 4,157,200 | 6/1979 | Johnson | 296/1 S |
| 4,160,494 | 7/1979 | McCambridge | 296/1 S |
| 4,214,787 | 7/1980 | Chain | 296/1 S |
| 4,257,641 | 3/1981 | Keedy | 296/1 S |

Primary Examiner—Richard A. Bertsch
Attorney, Agent, or Firm—Herzig & Walsh, Inc.

[57] ABSTRACT

An air deflector for vehicles to reduce wind resistance while moving. Two flat panels are provided hinged to upright posts, preferably mounted on the bumper of a vehicle. The panels are collapsable or retractable. In one position they are swung outwardly into a v-shaped configuration with the apex at the front. In retracted position they are folded back in a position parallel to each other adapted for parking or storage. Guide means are provided on the back side of the panels to facilitate their being deployed outwardly. The outer edges of the panels are mounted on rotatable posts having sprockets on them and a sprocket chain mechanism is provided with connections to the interior of the automobile so that the panels can be deployed outwardly or retracted from within the vehicle.

7 Claims, 5 Drawing Figures

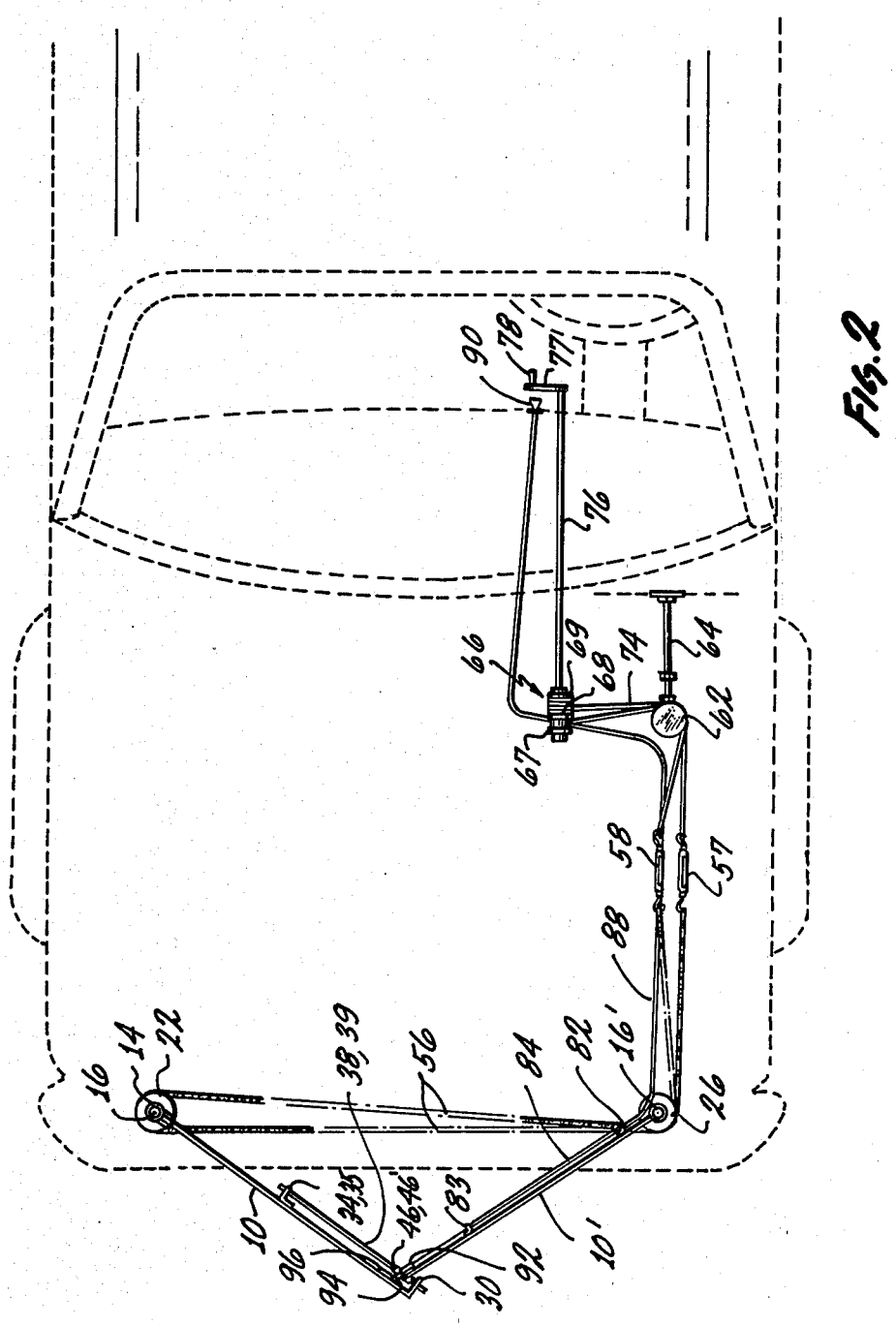

AIR DEFLECTOR FOR VEHICLES

BACKGROUND OF THE INVENTION

1. Field of the Invention

The field of the invention is that of air deflectors for vehicles having the purpose of reducing wind resistance or air drag so as to thereby improve the mileage obtained per gallon of fuel. The invention is accordingly concerned with conservation of energy.

2. Description of the Prior Art

Of prior art known to the inventor the following patents are thought to be the most relevant: U.S. Pat. Nos. 3,484,130; 3,797,879; 3,815,948; 3,866,968; and 4,095,835.

The need for energy conservation is a contemporary problem with which everyone is familiar. Considering the vast use of vehicles, particularly automobiles, in the United States any device or apparatus that can improve fuel consumption contributes to energy conservation and is significant.

It is well known that all vehicles on the highway encounter a very substantial wind resistance depending, of course, on the velocity at which the vehicle is traveling. Wind resistance produces air drag so that increased power is necessary to drive a vehicle. The air drag can be reduced by the use of air deflectors which have been known in the past. However, the prior art has not met the need for such a deflector or deflector system which is sufficiently simplified, economical and easy to fabricate and install to adequately meet the problem. In this respect the prior art is deficient.

The herein invention as described in detail hereinafter discloses a device which meets the foregoing requirement and fulfills the need for purposes of accomplishing the ends desired.

The herein invention as described in detail herein after is calculated to overcome all of the foregoing deficiencies and to meet the demand for such a device.

SUMMARY OF THE INVENTION

A preferred form of the invention has been briefly described in the abstract. In this form of the invention it takes the form of flat, generally rectangular panels, hinged to posts upstanding from the front bumper of an automobile. The panels are extendable into a v-shaped configuration with apex pointing forward for purposes of reducing wind resistance. The panels are collapsible or retractable around the posts from which they are mounted into a flat parallel position in front of the vehicle.

The posts carrying the panels have mounted on them sprocket wheels and a sprocket chain is provided with connections and linkages to an operating handle within the vehicle whereby the operator can very conveniently from within the vehicle move the deflector panels to operative position or to collapse or retract them to parking or storage position.

In the light of the foregoing a primary object of the invention is to make available a simplified form of air deflector means constructed to be mounted on the bumper of an automobile with means for readily operating the deflector means between deflecting position and collapsed or parking and storage position.

A further object is to realize an apparatus as in the foregoing wherein flat rectangular deflector panels are provided mounted on vertical rotatable posts having sprocket wheels mounted on them with a sprocket chain means and linkages whereby the deflector means can be readily operated between its two positions from within a vehicle.

Further objects and additional advantages of the invention will become apparent from the following detailed description and annexed drawings.

BRIEF DESCRIPTION OF THE DRAWINGS

FIG. 2 is a schematic view illustrating an installation of the invention in a vehicle;

DESCRIPTION OF THE PREFERRED EMBODIMENT AND BEST MODE OF PRACTICE

Figure 1:
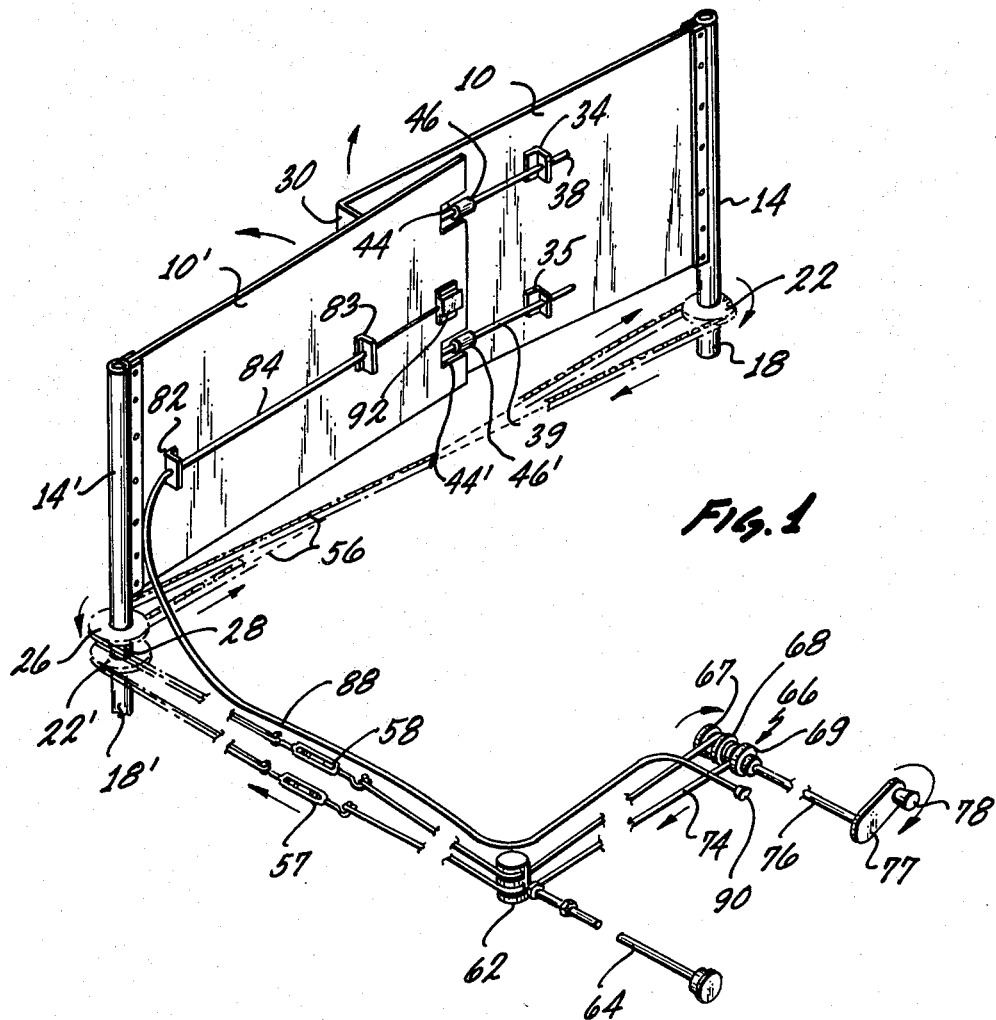
FIG. 1 is a perspective view of a preferred form of the invention.
Figure 5:
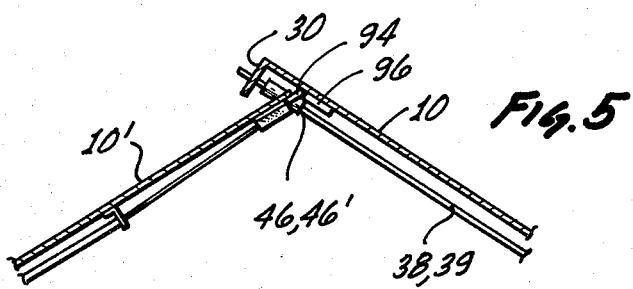
FIG. 5 is a partial schematic view of the deflector panels in extended locked position.

FIGS. 1-5 of the drawings show a preferred form of the invention which has been reduced to practice and successfully tested.

In these figures numerals 10 and 10' designate a pair of flat panels which may be constructed of wood such as plyboard or plastic or comparable material, and the material is preferably strong but light in weight.

As may be seen in the figures panel 10 at its outer end is attached to a tubular member 14 and this attachment may be by any suitable means. The member 14 is hinged or rotatable about a stem 16 having a lower part 18 that may preferably be supported from the front bumper of a vehicle as illustrated in FIG. 2. Carried on the member 14 is a sprocket wheel 22 that will be referred to again presently.

The panel 10' is similarly mounted to hinge or move rotatably in a similar manner. The supporting structure for panel 10' is identified by similar reference characters primed.

The structure at the end of panel 10' is slightly different in that there is an additional sprocket wheel 26 which is above the sprocket wheel 22, there being a bushing 28 in between these sprocket wheels.

Figure 3:
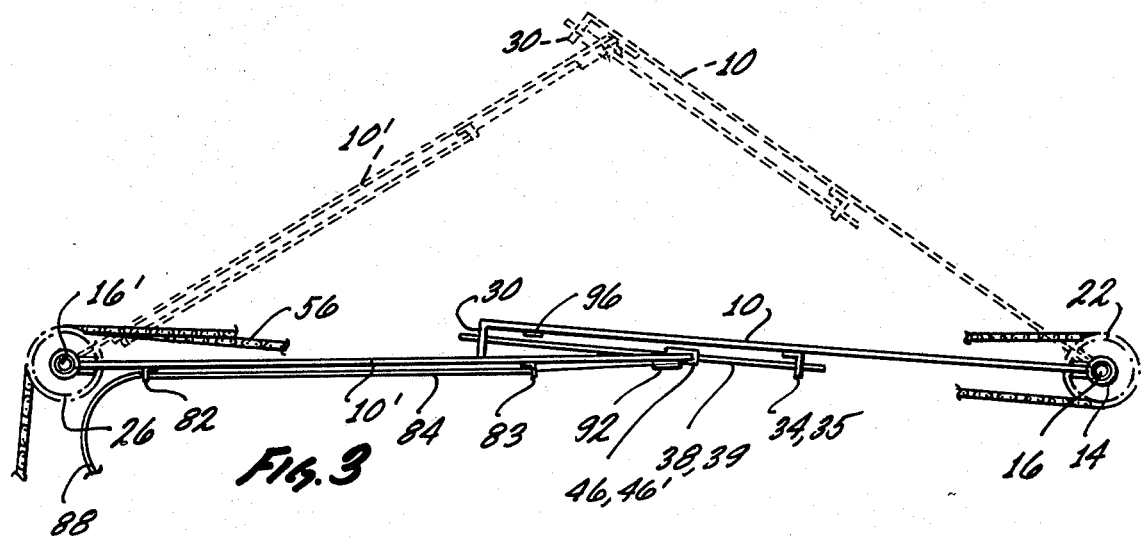
FIG. 3 is a planned view of the deflector means in retracted position, the extended position being shown in broken lines.
Figure 4:
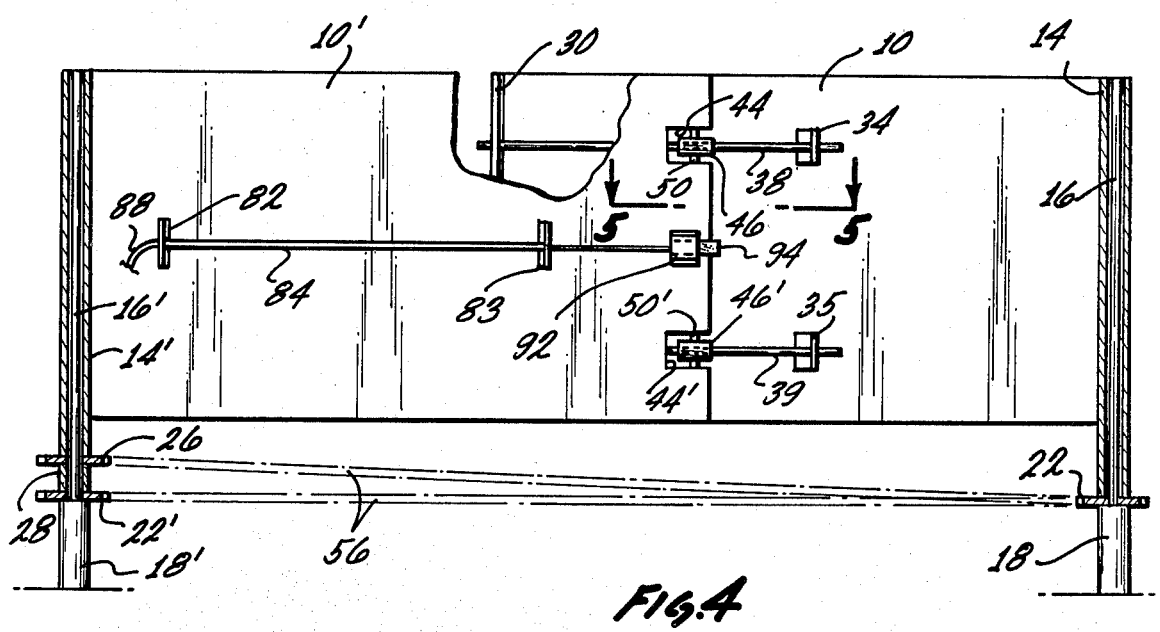
FIG. 4 is an elevational view of the inside of the deflector means.

The panels 10 and 10' move between a retracted position shown in full lines in FIG. 3 and an extended deflecting position as shown in broken lines in FIG. 3. The panels are shown in extended position in FIG. 2, also.

Guide means are provided so that when the panels are extended they operate effectively to move to the extended position and to be held therein.

As may be seen in the Figures at the end of the panel 10 is a right angle portion 30 and on the inside of the panel 10 are bracket members 34 and 35. Extending through these bracket members and through the right angle portion are guide rods 38 and 39.

At the inner end of panel 10' there are rectangular cutouts 44 and 44'. Mounted in these cutouts, respectively, are sleeves or bushings 46 and 46' which form guide members for the guide rods 38 and 39. The guide sleeves 46 and 46' are rotatably mounted on pivots or arbors 50 and 50' in the cutouts 44 and 44'. From the foregoing it can be seen that when the panels 10 and 10' are moved from the full line position of FIG. 3 to the dotted line position they remain in an angular guided relationship and form a v-shaped deflecting assembly when in the broken line position.

Means are provided operable from within the vehicle for easily extending the deflector to its operative position shown in FIG. 2 and retracting it to a collapsed position for parking or storage.

Numeral 56 designates a sprocket chain, one end of which is connected to a turn buckle 57 and the other end of which is connected to a turn buckle 58, these turn buckles being within the engine compartment of the vehicle. As may be seen, the sprocket chain passes over the sprocket wheel 22', over the sprocket wheel 22' and back over the sprocket wheel 26 back to the other turn buckle.

Numeral 62 designates a pulley block having two pulleys in it that is supported on the end of a stem 64 mounted from the fire wall of the vehicle.

Numeral 66 designates a spool member having flanges 67, 68, and 69 and having wound on it on opposite sides of the flange 68 convolusions of a flexible cord or cable 74. The spool 66 is on a stem 76 on the end of which is a hand crank 77 with a crank handle 78 for rotating the spool. Portions of the cord or cable 74 pass over the pulleys and the pulley block 62 and are attached to the turn buckles 57 and 58. The tension in the sprocket chain and in the cords can, of course, be adjusted by means of the turn buckles.

In addition to the means for operating the deflector from within the vehicle, latch means are provided for latching it in its extended deflecting position. On the inside of the panel 10' are brackets 82 and 83 from which are mounted a guide tube 84 for a flexible operating cable 88. This operating cable extends back through the fire wall of the vehicle to the dashboard and on the end of it is an operating handle or button 90 as may be seen in the figures.

Numeral 92 on the inside of panel 10' is a member providing a slideway for a latch member 94 at the end of the cable 88 which can be retracted or moved forward by the cable 88 for latching and unlatching the panels 10 and 10'. When the latch member 94 is moved forward, it comes into engagement with latch block 96 on the inside of the panel 10 so that the panels are held in their extended condition forming a v shape pointing forwardly and are held from being deflected inwardly by the force of the air or wind against them. The panels can be unlatched merely by pulling on the handle 90 and the cable 88 to retract the latch member 94.

OPERATION AND UTILIZATION OF THE INVENTION

From the foregoing those skilled in the art will readily understand the operation and use or utilization, that is, practice of the invention. When the vehicle is parked or in storage, normally the panels 10 and 10' are moved into the retracted position as illustrated in FIGS. 1 and 3. This is done merely by turning the crank 77 by its handle 78 which causes movement of the cable 74 and sprocket chain 56 in a manner to rotate the sprocket wheels 22 and 22' in opposite directions so as to rotate the members 14 and 14' to move the panels inward to the retracted position. Conversely when it is desired to deploy the air deflector into operating position the crank 77 is turned in the opposite direction and through the cable 74 and the sprocket chain 56 the panels 10 and 10' are moved about their mountings, that is, rotated outwardly and to the dotted line position shown in FIG. 3 or the full line position shown in FIG. 2. In the position the latch mechanism is operated through the handle 90 to latch the panels in their deployed position in the manner described in the foregoing.

In the deployed position the panels form a forwardly extending v-shaped or configuration which causes the wind resistance to be reduced by deflecting it laterally to the sides of the vehicle. By reducing the air resistance the power required to maintain any given speed is reduced and as a result mileage is improved and there is a realization of conservation of energy.

When it is desired to park the vehicle or put it in storage, the air deflector can be very easily collapsed or retracted merely by operating the crank from within the vehicle, the latch mechanism similarly being operable from within the vehicle so as to avoid any inconvenience to the user.

The device as described is economical and relatively easy to fabricate and to install and accordingly those skilled in the art will readily understand and appreciate how the objects as set forth in the foregoing are realized.

The foregoing disclosure is representative of a preferred form of the invention and is to be interpreted in an illustrative rather than a limiting sense, the invention to be accorded the full scope of the claims pended hereto.

What is claimed is:

1. A drag reducing apparatus for use with vehicles comprising in combination, deflector means including panels constructed to be positioned to form a v-shaped wind deflector extending forwardly of the vehicle, said panels being constructed to be collapsible into a parallel position with one panel forwardly of the other, means mounting the panels to be extendable forwardly of the vehicle including vertical mounting posts and operating means for the panels operable from within the vehicle including linkage mechanism connected to the panels whereby the panels may be retracted into a collapsed position from within the vehicle, the panels in the collapsed position being in a substantially flat parallel partly overlapping relationship, guide means on the inside of each of the panels, the guide means on the panels being constructed whereby the panels can be rotated outwardly simultaneously into a v-shaped configuration in fully extended position.

2. Apparatus as in claim 1 including means for rotating the panels about the mounting posts for deploying the panels to a forward extended position and for retracting the panels to a rearward position.

3. Apparatus as in claim 2 wherein said last means includes sprocket wheels carried by said supporting posts, and flexible means including a sprocket chain cooperable with said sprocket wheels and extending into the automobile, and means within the vehicle for operating said flexible means whereby to move said panel members between extended and retracted positions.

4. Apparatus as in claim 3 wherein said sprocket wheels include a sprocket wheel on each of said posts and a third sprocket wheel with the said sprocket chain arranged whereby operation of the means for rotating causes the panels to rotate in opposite directions about the said posts.

5. Apparatus as in claim 3 including guide means provided on the inside of the panels and interconnected whereby the panels are constrained to a v-shaped configuration while being deployed to extended position and while being retracted to inward position.

6. Apparatus as in claim 1 wherein said guide means include brackets on the inside of one of the panels, guide rods extending through the brackets, and guide sleeves carried by the other panel through which the guide rods extend, the guide sleeves having mountings allowing them to swivel when the panels move relatively.

7. Apparatus as in claim 6 including latch means for latching the panels in deployed position and control means extending to the interior of the vehicle, for operating the latch means.

* * * * *